Oct. 21, 1969    J. A. KJELLSTROM ET AL    3,473,234
SHIP COMPASSES

Filed Sept. 16, 1966                                    2 Sheets-Sheet 1

INVENTORS
Jan Alvar Kjellstrom
Alvar Eskil Petrus Kjellstrom
BY 3,473,234
SHIP COMPASSES
Jan Alvar Kjellstrom and Alvar Eskil Petrus Kjellstrom,
both of Leksandsvagen 26, Norrviken, Sweden
Filed Sept. 16, 1966, Ser. No. 579,970
Claims priority, application Sweden, Sept. 17, 1965,
12,157/65
Int. Cl. G01c 17/08
U.S. Cl. 33—223                                                4 Claims

ABSTRACT OF THE DISCLOSURE

A compass composed of a spherical housing made up of two half-sections; said housing containing a liquid, and a cup-shaped member mounted on a gimbal in the housing, which is in turn pivoted on a half-sphere spaced from the interior of the housing and with the liquid in said space, the two half sections of the housing being joined by a V-shaped packing so that such sections are capable of movement to or from each other in conformity to a change of liquid volume created by rising temperature variations.

---

The present invention relates to an improvement in ship compasses, and to one provided with a spherical, liquid-filled compass housing, mounted in a gimbal arrangement effective in at least one direction.

The inconvenience encountered in known compasses is, among other things, that the compass housing will make a comparatively fast rotative movement when the ship is moving in the sea, making it difficult to read the compass and also difficult to keep the ship on the right course. This is particularly true in the case of compasses intended for use on small ships such as motor boats and sailing yachts, the movements of which can be rather rapid in the sea.

Therefore, the primary object of the present invention is to provide a ship's compass in which the above inconveniences are eliminated. The invention consists primarily in the fact that the pivot which supports the compass needle or the compass card is fixed to the bottom of a half-sphere, which is pivoted in the compass housing by means of diametrically opposite pivots, and the diameter of the half sphere is chosen in proportion to the internal diameter of the compass housing, so that a clearance space filled with a liquid is located between the two parts.

Figure 1:
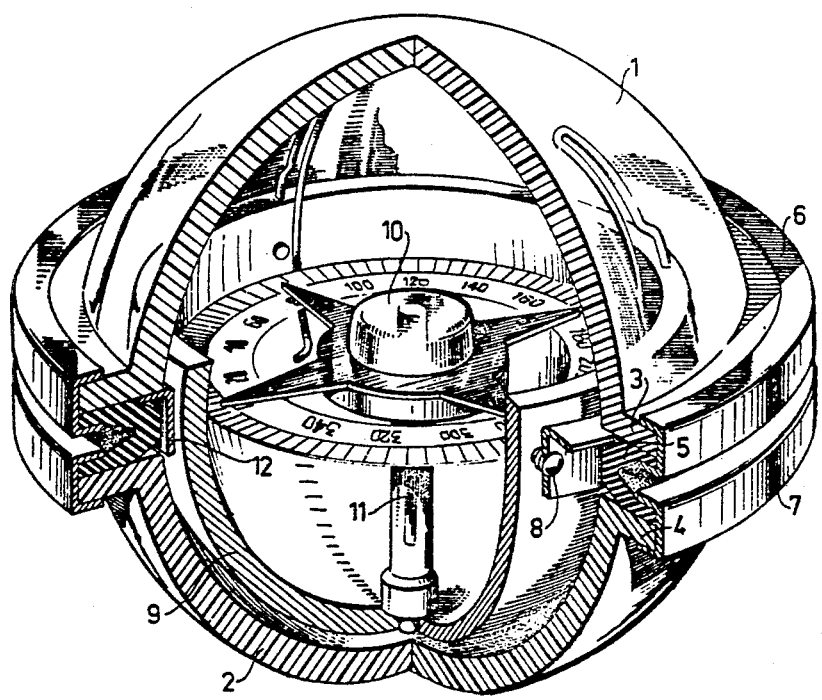
Figure 2:
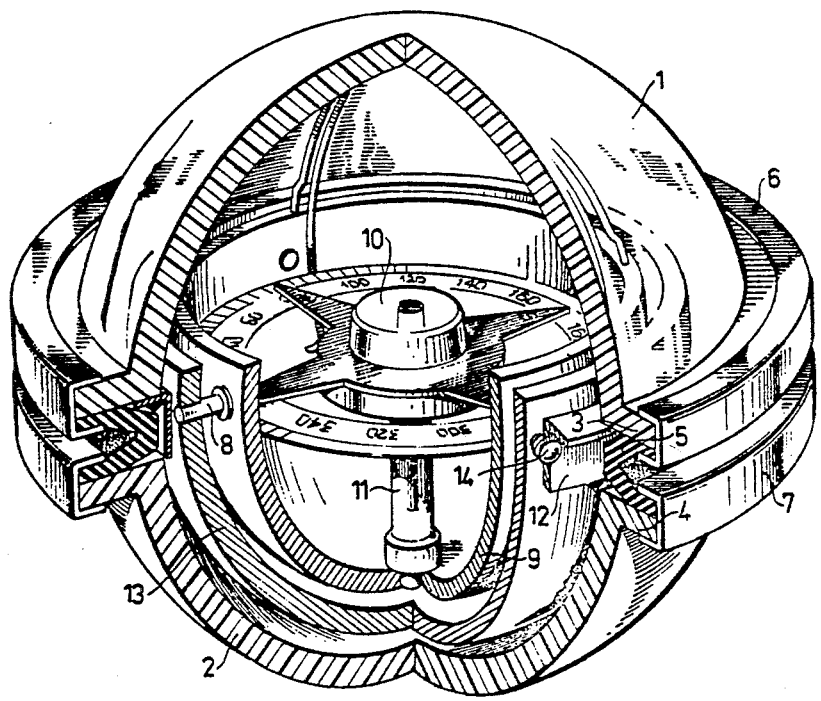

The invention will be described further when considered in conjunction with the illustrations in the accompanying drawings, in which FIG. 1 shows in perspective and partly in section, an embodiment of a compass made according to the invention and provided with a gimbal mounting effective only in one direction; and FIG. 2 shows in a similar manner, a compass provided with a gimbal mounting effective in two directions perpendicular to each other.

In FIG. 1 an upper half-sphere is shown at 1 and a lower half-sphere is shown at 2, said half-spheres being connected to each other for the purpose of co-operating in forming a spherical compass housing. These two half-spheres 1 and 2 are provided around their respective peripheral edges with a radially-projecting flange 3, 4, between which a packing strip or gasket 5 is disposed. Said strip or gasket 5 is made of flexible material and is bifurcated adjacent its outer edge so that it is substantially V-shaped in cross section. One of the branches or wings of the strip is coupled to the flange 3 by being embraced with said flange by an annular, channel-shaped clamping ring 6. Similarly, a ring 7 embraces the second branch or wing of the strip or gasket 5 together with the flange 4. The surfaces of the strip or gasket 5 which contacts the flanges 3 and 4 and the clamping rings can be either smooth as shown in the drawing or can be provided with one or several rim-shaped parts or notches co-operating with corresponding notches in the opposite surfaces. Through this arrangement it is possible for the compass housing, filled completely with a liquid, to expand or contract, according to the volume changes of the liquid under changing temperatures.

In the compass housing is located an inner half-spherical part or cup 9 that is freely pivotal by means of diametrically arranged pivots 8. On the bottom of the part 9 is fixed a centrally-located bearing pin 11 intended for the pivoting of the compass card 10. The outer diameter of the half-spherical or cup-shaped part 9 is chosen in proportion to the internal diameter of the compass housing and is less than the inside diameter of the housing so that a space or clearance exists between the interior of the compass housing and the part or cup 9, which clearance is completely filled with a compass liquid. For fixing the pivots 8, a metal ring, angular in cross sectional shape, is suitably firmly connected to the upper half-spherical part 1 of the housing.

By means of the above-described construction, all of the liquid in the half-sphere is forced to take part in the circulation when the half-sphere is moved. The flow of the liquid then tending to rise, retards movement of the part 9 and increases the sluggishness of movement of the device and therefore the movements of the part 9, supporting the compass card 10 are extremely slow even during violent movements of the ship. A compass with a gimbal movement effective only in one direction, as shown in FIG. 1, is normally mounted in the ship in such a way that the pivot shaft of the part 9 is parallel with the longitudinal direction of the ship, as the rolling movements of the ship normally are more disturbing than the pitching movements, which latter movements can usually be absorbed by the swing which the compass card can make on its pivot 8.

The compass housing can be mounted in a suitable holding device, for example, a binnacle, and for such mounting the upper clamping ring 6 can be conveniently used so that the lower half-sphere 2 of the compass housing can move freely in relation to the upper half-sphere when the volume of the liquid changes owing to variations in temperature.

The lower clamping ring 7 might also be used for the mounting of the compass under certain circumstances, so that the upper half-sphere can move in relation to the lower half-sphere.

The embodiment shown in FIG. 2 differs from the above-described embodiment in that it has a gimbal mounting effective in two directions perpendicular to each other. In FIG. 2 the same reference characters as are employed in FIG. 1 have been used for corresponding parts. As shown in FIG. 2, the half-spherical part or cup 9 supporting the compass card 10, has its pivots 8 pivoted in a second or outer half-spherical part 13 located between the part 9 and the lower half-sphere 2 of the compass housing. The part 13 has pivots 14, where are perpendicularly arranged with respect to the pivots 8 for the first part or cup 9, so that the cup 13 is freely pivoted in the compass housing. The diameters of the concentrically-arranged parts 9 and 13 and that of the parts 1 and 2 of the compass housing are chosen in proportion to each other so that clearances or spacings, filled with the liquid, exist both between the parts 9 and 13 as well as between the part 13 and the interior of the compass housing. Through this device the compass will be mounted with a gimbal arrangement with regard to the rolling and pitching movements of the ship, with the dampening effect operative in all directions.

In both or either of the embodiments described, the half-spheres 1 and 2 of the compass housing and the half-spherical part or parts 9 and 13 can be manufactured from transparent plastic material so that lighting, if required can be arranged outside or below the spherical compass housing and located so that the compass when mounted for example, in the deck, can be read both from above and below.

What we claim is:

1. A ship's compass comprising, a spherical housing containing a liquid, a half-sphere contained within the housing and spaced therefrom, a cup-shaped member located within the half-sphere and spaced therefrom, a pivot for the cup-shaped member, said pivot constituting a gimbal mounting for said cup-shaped member, the cup-shaped member carrying a compass indicator, the half sphere being pivoted in the housing, the liquid filling the spacing between the half-sphere and the cup-shaped member and said liquid also filling the spacing between the half-sphere and the interior of the housing.

2. A ship's compass according to claim 1, wherein the compass housing is composed of upper and lower half-spheres, each of the same having an annular, radially-extending, outwardly projecting flange, the flanges of the said half-spheres being spaced apart, a V-shaped packing strip disposed between the respective spaced flanges on the said half-spheres, the packing strip having divergent wings disposed respectively against the spaced flanges, a channel-shaped clamping ring embracing one of the flanges and one of the wings of the packing strip and a similar channel-shaped clamping ring embracing the other flange and the wing of the packing strip that is disposed against it.

3. A ship's compass according to claim 1, wherein each of the two half-spheres of the compass housing is provided with the radially-projecting flange extending continuously around its edge, and against which the respective wing of the packing strip is held in close embrace by means of the U-shaped clamping ring embracing the wing and the flange.

4. A ship's compass comprising, a housing composed of two hemispherical sections, each of said sections having an annular peripheral flange, a gasket disposed between the flanges of the two housing sections, said gasket being bifurcated in its outer area, an annular, channel member embracing one of the bifurcations and one of the flanges, a second channel member embracing the second bifurcation and the second one of the flanges, a hemispherical cup disposed within the housing and arranged on horizontal pivots therein, said cup carrying compass designating elements and providing a spacing between its exterior and the interior of the housing, and a fluid within the housing, said fluid entering said spacing.

References Cited

UNITED STATES PATENTS

| | | | |
|---|---|---|---|
| 291,403 | 1/1884 | Ritchie | 33—223 |
| 2,026,919 | 1/1936 | Stright | 33—223 |
| 2,192,148 | 2/1940 | Otto | 33—223 |
| 2,361,548 | 10/1944 | Kaufman et al. | 33—223 |
| 3,199,210 | 8/1965 | Ledgerwood | 33—223 |

FOREIGN PATENTS

| | | |
|---|---|---|
| 708,794 | 7/1941 | Germany. |
| 267,869 | 9/1929 | Italy. |

ROBERT B. HULL, Primary Examiner